United States Patent Office 2,833,772
Patented May 6, 1958

2,833,772
ORGANIC COMPOUNDS

Richard V. Heinzelman, Robert B. Moffett, and Robert H. Levin, Kalamazoo, Mich., assignors to The Upjohn Company, Kalamazoo, Mich., a corporation of Michigan No Drawing. Application August 16, 1955
Serial No. 528,805

4 Claims. (Cl. 260—292)

This invention relates to new organic compounds and is particularly directed to tropine benzhydryl ether and tropine p-chlorobenzhydryl ether N-oxides either as the free bases or as acid addition salts thereof.

It is an object of the invention to provide novel physiologically active compounds. It is a further object to provide novel antichlolinergic and antihistaminic drugs. It is a further object to provide novel agents for treating Parkinsonism. It is a further object to provide novel compounds which are safe and effective for these purposes and have a higher therapeutic index than the corresponding tertiary amine.

These and other objects are accomplished in the novel compounds of the invention which are represented by the following basic formula:

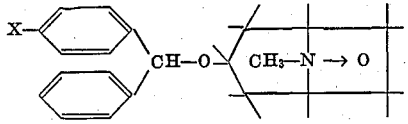

wherein X is hydrogen or chlorine and can exist and can be used for the purposes of the invention in the form of the free base or an acid addition salt thereof with a pharmacologically acceptable acid such as hydrochloric, hydrobromic, hydriodic, sulfuric, phosphoric, nitric, acetic, benzoic, salicylic, glycolic, succinic, nicotinic, tartaric, maleic, malic, lactic acids, and the like.

The invention may be more fully understood by the following examples which are illustrative only and not to be construed as limiting.

*Example 1.—Tropine benzhydryl ether N-oxide free base*

An aqueous solution of ten grams (0.0248 mole) of tropine benzhydryl ether methanesulfonate and twenty milliliters of ten percent sodium hydroxide was extracted four times with ether. The ether solutions were washed twice with water and then with saturated sodium chloride. The ether was distilled leaving a gummy free base. This was dissolved in 75 milliliters of ethanol and ten milliliters of thirty percent hydrogen peroxide was added. After standing at room temperature for five days, the solution was treated with a slurry of platinum-on-charcoal and shaken for two hours. The mixture was filtered through diatomaceous earth and the solvent was removed under reduced pressure below thirty degrees centigrade. Tropine benzhydryl ether N-oxide free base was thus obtained as a colorless gum.

*Example 2.—Tropine benzhydryl ether N-oxide hydrochloride*

The gummy free base of Example 1 was dissolved in ethanol, made acidic with ethanolic hydrogen chloride, and diluted to turbidity at the boiling point with absolute ether. On cooling, the product crystallized. The product was collected, washed with absolute ether, and dried, giving 7.6 grams (85 percent) of tropine benzhydryl ether N-oxide hydrochloride as white crystals, melting point 176–190 degrees centigrade with decomposition.

*Analysis.*—Calcd. for $C_{21}H_{26}ClNO_2$: C, 70.08; H, 7.28; N, 3.89; Cl, 9.85. Found: C, 70.26; H, 7.24; N, 3.79; Cl, 9.80.

By substituting tropine p-chlorobenzhydryl ether methanesulfonate for the tropine benzhydryl ether methanesulfonate of Example 1 there are obtained, by following the procedures of Examples 1 and 2, tropine p-chlorobenzhydryl ether N-oxide free base and the hydrochloride thereof.

In place of hydrochloric acid there may be substituted appropriate acids to obtain the hydrobromide, the hydroiodide, the sulfate, the phosphate, the nitrate, the acetate, the benzoate, the salicylate, the glycolate, the succinate, the nicotinate, the tartrate, the maleate, the malate, the lactate, and the like.

The novel compounds of this invention can be used for the same purposes and in the same dosage forms, such as tablets, injectables, and elixirs, as tropine benzhydryl ether and the salts thereof.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the class consisting of tropine benzhydryl ether N-oxide, tropine p-chlorobenzhydryl ether N-oxide, and acid addition salts thereof with pharmacologically acceptable acids.

2. A compound selected from the class consisting of tropine benzhydryl ether N-oxide free base and tropine p-chlorobenzhydryl ether N-oxide free base.

3. The acid addition salt of a pharmacologically acceptable acid and a compound according to claim 2.

4. Tropine benzhydryl ether N-oxide hydrochloride.

References Cited in the file of this patent

UNITED STATES PATENTS

| 2,595,405 | Phillips | May 6, 1952 |
| 2,706,198 | Weijlard | Apr. 12, 1955 |

OTHER REFERENCES

Manske et al.: The Alkaloids, vol. I, p. 286 (1950).